Patented June 21, 1949

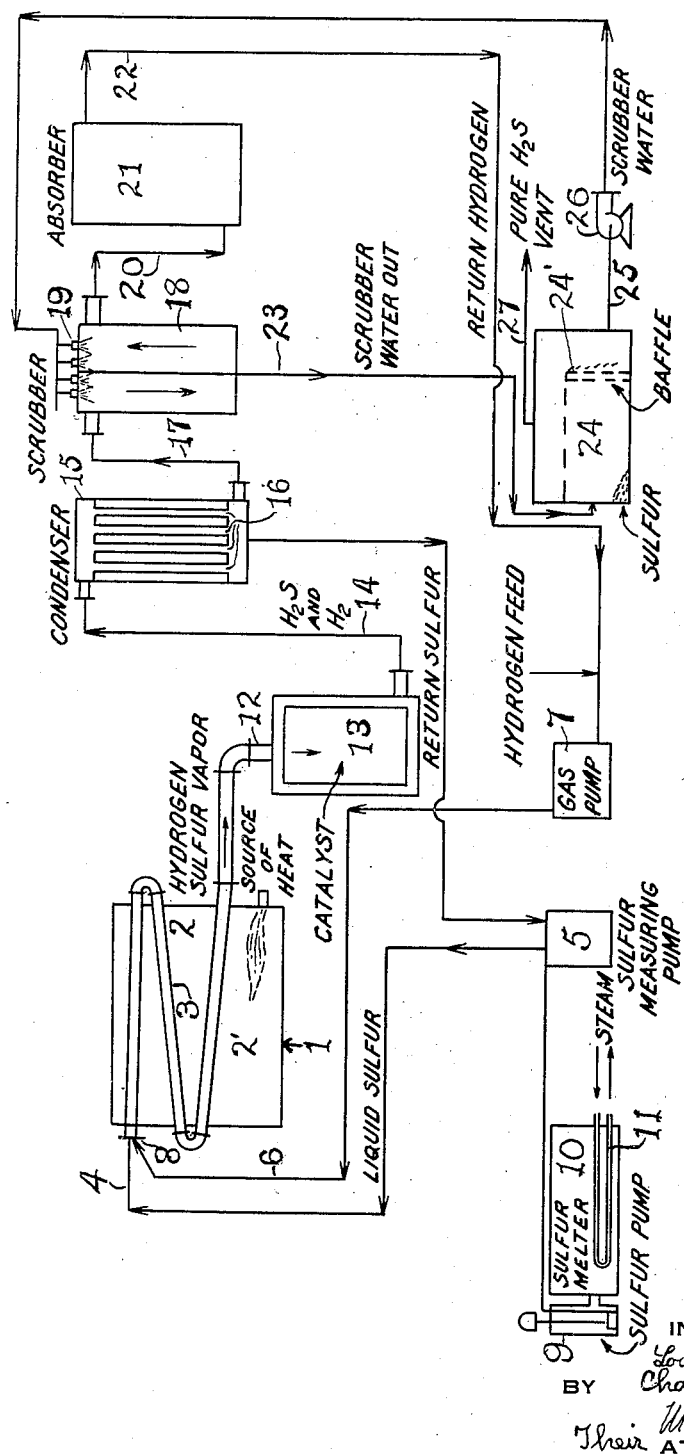

2,474,066

UNITED STATES PATENT OFFICE 2,474,066

METHOD OF MAKING HYDROGEN SULFIDE

Louis Preisman and Charles F. Hobson, Charleston, W. Va., assignors to Barium Reduction Corporation, Charleston, W. Va., a corporation of Delaware Application January 4, 1946, Serial No. 639,081

3 Claims. (Cl. 23—181)

This invention relates to the production of hydrogen sulphide ($H_2S$) from its component elements and has for its particular objects the provision of a simple, economical and efficient method of effecting the direct interaction of elemental sulphur and gaseous hydrogen to produce an almost theoretical yield, about 96%, of hydrogen sulphide of a high degree of purity. A further object of the invention resides in the fact that in carrying out such method a relatively low pressure, not exceeding about ten lbs. per square inch is desirably maintained in the system with the consequence that the method is non-hazardous to perform. A still further object of the invention consists of the employment of a novel catalyst, namely natural bauxite, which is inexpensive and yet highly efficient for promoting the desired reaction between said components. Other advantages of the invention are hereinafter set forth.

Heretofore, as we are well aware, it has been proposed, as set forth in the Patent No. 2,214,859 to effect the direct interaction of pre-vaporized sulphur and gaseous hydrogen at atmospheric pressure in the presence of a catalyst which included at least one compound of a group consisting of the oxides and sulphides of cobalt, nickel and molybdenum and accordingly we disclaim, as not being within the scope of our invention as embraced within the scope of the appended claims, any such method wherein such special, relatively expensive catalytic material is employed and the conditions of operation as required by the disclosure of said patent are maintained. The advantages possessed by our novel method over that disclosed in said patent are fully set forth in the following detailed description of our invention and the drawings forming a part thereof, in which latter is shown a diagrammatic flow sheet of our method as commercially practiced.

Referring to the drawings and the method of operation thereby disclosed, the reference numeral 1 designates a tubular vaporizer which comprises a heating chamber 2, equipped with a source of heat 2', a bank of inclined tubes 3, desirably of chrome nickel steel or other heat-resisting steel alloy, and into which a liquid sulphur supply conduit 4 is adapted to discharge. The latter conduit communicates with a metering pump 5 which serves to discharge small liquid sulphur slugs of a pre-determined size at predetermined intervals into said bank of tubes. A second conduit 6, which is in communication with a gas pump 7, also discharges into said bank of tubes at a point in close proximity to the discharge end of the conduit 4 and a closure plate 8, through which said conduits 4 and 6 project, serves to seal the inlet end of said bank of tubes against the entrance of extraneous air. A second liquid pump 9 is adapted to continually supply molten sulphur from the vat or vessel 10 equipped with a steam heating coil 11, to said metering pump.

The hot mixture of sulphur vapors and hydrogen gas which is discharged from the vaporizer passes through the conduit 12 and is fed into a fire-brick-lined catalyst chamber 13 that is filled with small pieces of the well-known natural ore, bauxite. The latter is extensively mined in North America, South America and elsewhere, but the ore mined in South America has been found to be the most desirable of the available bauxites for use in the conversion of the mixture of sulphur vapors and gaseous hydrogen into hydrogen sulphide, it being possible by our method, when an equal molar excess of hydrogen is employed, to obtain approximately a 96% conversion of the sulphur fed into the catalyst chamber into hydrogen sulphide. The reaction which occurs in the catalyst chamber being exothermic, it is possible to maintain the temperature of the mixture so introduced therein at an optimum temperature without supplying additional heat from an external source and accordingly it is possible to utilize heat resistant equipment, such as the aforesaid fire-brick-lined vessel, thus minimizing wear and tear on the equipment. The temperature at the entrance to the catalyst chamber is desirably maintained at about 900° F. to 950° F., and this can be effectively controlled by varying the flow, to the extent required, of the excess hydrogen gas.

The products of the reaction in the catalyst chamber, which comprise principally hydrogen sulphide, the excess of hydrogen gas and about 4% of the unreacted sulphur originally fed into the vaporizer, are conducted through the conduit 14 to a tubular condenser 15, around tubes 16 of which steam-heated water, at a temperature of about 212° F., is being circulated and therein the free sulphur is condensed out. From the condenser the uncondensed gases with traces of entrained condensed sulphur are conducted through a conduit 17 to a scrubber 18 wherein they are freed from the last traces of sulphur mist by water sprays delivered from the nozzles 19. The water discharged from the scrubber is the source of a minor proportion of substantially chemically pure hydrogen sulphide which is recovered in the manner hereinafter explained. Desirably the scrubber is equipped with baffles, not shown, so that the gases may be sprayed as they pass in a co-flow relation with the water sprays and will then reverse so as to flow counter to the water.

From the scrubber, the uncondensed gases are conducted through a conduit 20 to a battery of absorbers 21 (only one of which is shown) which remove the hydrogen sulphide and the unabsorbed hydrogen gas is returned through the conduit 22 to the gas pump 7 for re-circulation through the vaporizer. The absorbers 21 are charged with appropriate chemicals, say, caustic soda for example, if sodium sulphide and sodium sulphydrate are desired or other appropriate absorbents if other sulphides or bi-sulphides are desired such as absorbent, for example, as ammonia with controlled temperature, if ammonia sulphide is to be produced, or an absorbent consisting of a salt of a heavy metal, if an insoluble sulphide is the product to be produced.

The water leaving the scrubber 18 flows back through the conduit 23 to a large closed tank 24 where the sulphur removed from the scrubbed gases settles out. The water overflows a baffle 24′ and thence passes through the outlet conduit 25 to a pump 26 by which it is returned to the spray nozzles. This whole system is under pressure, desirably averaging slightly over 5 pounds, this being the pressure of the gas at that point. Accordingly the top of the tank 24 is provided with a vent pipe 27, pure hydrogen sulphide gas will be discharged through said vent pipe which can be compressed and liquified for storage in cylinders and the removed gas will be continually replaced by charges of hydrogen sulphide gas emerging as bubbles from the water in the tank 24.

The bulk of the sulphur vapor which passes, as aforesaid, through the catalyst chamber unchanged and which comprises about 4% to 8% of that introduced into said chamber is condensed as a liquid in said tubular condenser 15 and is returned through the conduit 28 to the sulphur pump 5 for re-circulation through the system.

The heat necessary for boiling the aforesaid cooling water in the tubular condenser 15 is supplied by heat interchange with gases being cooled and as the water boils away it is replenished.

Among the principal features and advantages of our improved method of making hydrogen sulphide and its salts are:

(1) The novel catalyst, bauxite which is employed and which, as states, is remarkably efficient under extremely low pressures.

(2) The delivery of metered portions of liquid or molten sulphur as small slugs into the externally heated vaporizer which is desirably slightly over capacity so that each complete periodical slug of sulphur pumped into the vaporizer is completely volatilized.

(3) The promoting of the boiling or vaporizing of the sulphur slugs by the introduction of a stream of hydrogen gas over the boiling sulphur and in that way reducing the boiling point thereof or, conversely, increasing the rate of evaporation.

(4) The increase of the rate of reaction of hydrogen and sulphur vapors by utilizing an excess of hydrogen in the reaction, normally about an equal molar excess, and which excess, after the absorption of the products of reaction ($H_2S$) is returned to the front end of the system for re-use.

(5) The control of the temperatures in the vaporizer and the catalyst chamber by the aforesaid excess quantity of hydrogen employed.

(6) The almost theoretical conversion of the sulphur fed into the system, about 96%, which can be accomplished by employing our novel method.

(7) The condensation of the small amount of unreacted sulphur, about 4%, in an all steel vertical tubular condenser which is "cooled" by boiling water that is heated by heat exchange with the gas being cooled and the subsequent removal of the last traces of sulphur mist in the gas by passing the latter through a water spray scrubbing tower.

(8) The delivery of the wash water from the scrubbing tower into a settling tank where it is clarified and then re-used in the tower and which tank is vented above the water level therein whereby a virtually C. P. hydrogen sulphide can be drawn off which can be utilized for chemical reactions or for liquefaction by compression to liquid hydrogen sulphide to be stored in cylinders.

The co-inventor, Louis Preisman, named in this application is the applicant who filed an application on May 3, 1946, Ser. No. 667,004 entitled Method of making carbon bisulphide and hydrogen sulphide.

Various modifications of the method herein described within the scope of the appended claims may be made without departing from the spirit of our invention.

Having thus described our invention, what we claim is:

1. The method of making hydrogen sulphide by synthesis from its elements, which comprises intermittently discharging, at pre-determined intervals, metered amounts of sulphur in the form of molten sulphur slugs of a pre-determined size into a tubular vaporizing chamber and therein admixing the same with a stream of hydrogen gas in an amount considerably in excess of the molecular equivalent thereof in order to accelerate the volatilization of the sulphur slugs while simultaneously maintaining the temperature of the wall of the chamber above the boiling point of sulphur at atmospheric pressure, then passing the resultant mixture of sulphur vapors and hydrogen gas through a catalyst and therein effecting the synthesis of hydrogen sulphide by the interaction of the components of the mixture.

2. In the method of making hydrogen sulphide by synthesis from its elements, the steps which comprise the conducting of metered amounts of molten sulphur in the form of individual slugs of a pre-determined size through a heated tubular vaporizing chamber and effecting the complete vaporization of such slugs therein while simultaneously admixing with such sulphur a stream of hydrogen gas in an amount comprising a substantially molar excess of hydrogen based on the weight of the sulphur present in such chamber.

3. In the method of making hydrogen sulphide, the step which comprises intermittently introducing metered amounts of sulphur in the form of molten sulphur slugs into a vaporizing chamber and therein intimately admixing the same with a stream of hydrogen in an amount considerably in excess of the molecular equivalent of the sulphur in order to accelerate the volatilization thereof, while simultaneously maintaining the temperature in the vaporizing chamber sufficiently high to volatilize the sulphur present in said mixture.

LOUIS PREISMAN.
CHARLES F. HOBSON.

(References on following page)

REFERENCES CITED

The following references are of record in the file of this patent:

UNITED STATES PATENTS

| Number | Name | Date |
|---|---|---|
| 443,629 | White | Dec. 30, 1890 |
| 1,476,645 | Robinson | Dec. 4, 1923 |
| 1,613,632 | Wilkinson | Jan. 11, 1927 |
| 1,700,578 | Bacon | Jan. 29, 1929 |
| 1,941,702 | Maier | Jan. 2, 1934 |
| 1,945,163 | Rosenstein et al. | Jan. 30, 1934 |
| 2,187,393 | Simo | Jan. 16, 1940 |
| 2,214,859 | Maude et al. | Sept. 17, 1940 |
| 2,330,934 | Thacker | Oct. 5, 1943 |

OTHER REFERENCES

Seidell, "Solubilities of Inorganic and Organic Compounds," D. Van Nostrand Co., Inc., New York, (1919), vol. 1, pp. 316 and 322.